Aug. 23, 1966     KAZUO ISHIKAWA     3,268,381
METHOD OF CONSTRUCTING A PLASTIC CONTAINER
Filed Oct. 24, 1963
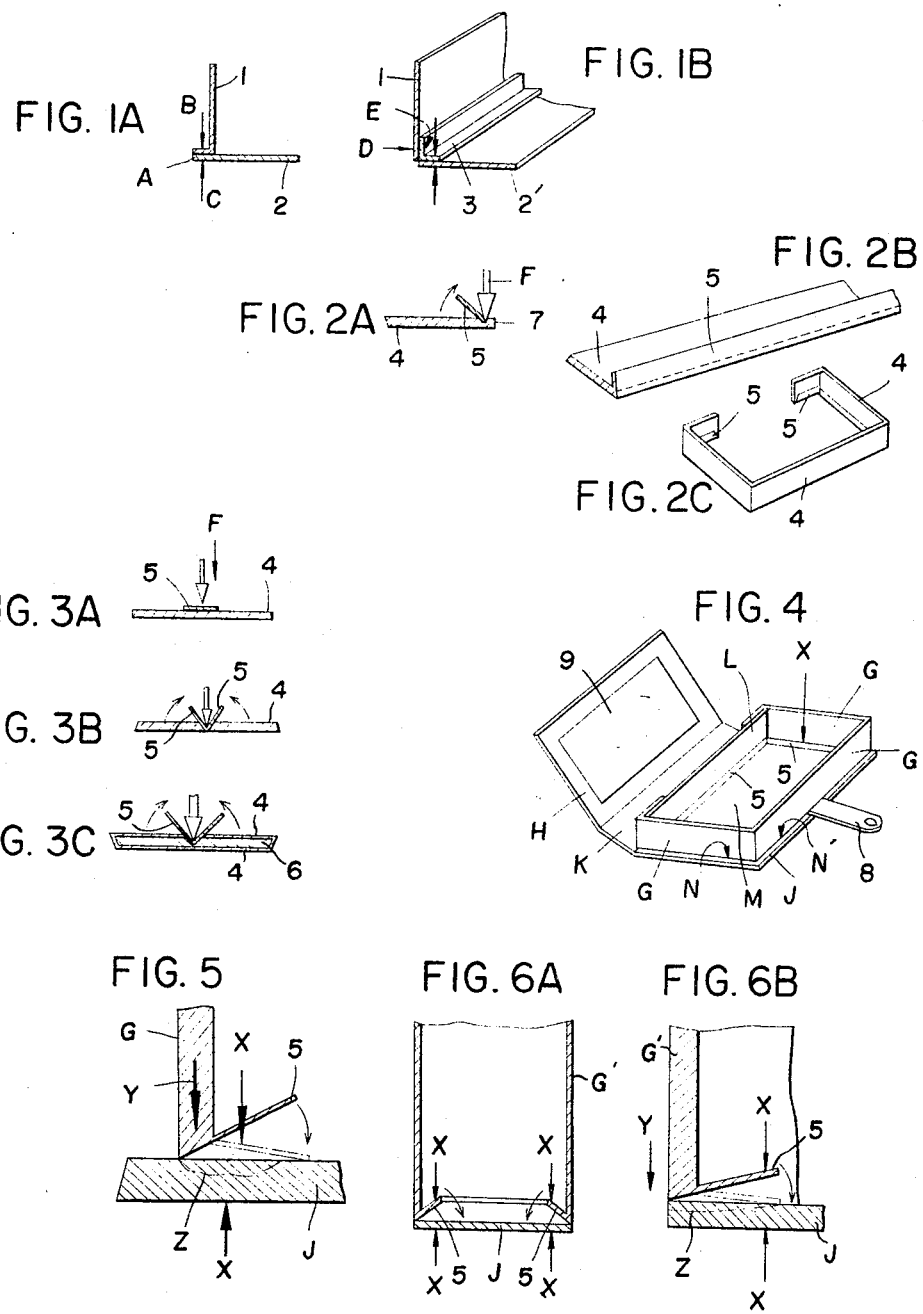
INVENTOR.
Kazuo Ishikawa
BY George B. Ayevick
Attorney United States Patent Office 3,268,381
Patented August 23, 1966

3,268,381
METHOD OF CONSTRUCTING A
PLASTIC CONTAINER
Kazuo Ishikawa, 448 Shishihone-machi,
Edogawa-ku, Tokyo, Japan
Filed Oct. 24, 1963, Ser. No. 318,734
1 Claim. (Cl. 156—251)

This invention relates to an improved method of constructing plastic containers as handbags, document cases, trunks, bags and the like, and has as its principal object to provide containers of excellent quality.

According to this invention, a plastic container is constructed by a method which comprises the steps of welding a tape of plastic material to one side edge of one of sheets of plastic material which are to be bonded together and welding said tape to the other of said sheets.

More particularly in one embodiment of this invention, a tape of thin plastic material, for example, vinyl chloride is superposed along one longitudinal edge of a sheet of the same plastic material, one side edge of said tape is welded to said longitudinal edge of said sheet, said sheet is shaped to form the side wall of a container, the bottom end of said side wall is closed by a second sheet of the plastic material and the non-welded side edge of said tape is welded to said second sheet along the periphery thereof.

Other objects and features of the invention will be apparent and more clearly understood from the following detailed description, when read with reference to the accompanying drawing, in which:

FIG. 1A shows a partial cross section of a vinyl chloride container constructed by a prior method;

FIG. 1B is a partial perspective view of a container constructed by another prior method;

FIGS. 2A, 2B and 2C show consecutive steps of constructing a container in accordance with this invention;

FIGS. 3A, 3B and 3C show corresponding steps of another embodiment of this invention;

FIG. 4 shows a perspective view of a finished container;

FIG. 5 shows a section helpful to explain the condition of welding; and

FIGS. 6A and 6B show the invention as applied to a cylindrical container.

Generally, containers constructed by thick or thin plates or thin films of vinyl chloride are formed by superposing one upon the other two or more sheets of vinyl chloride plates 1 and 2 (hereinafter the term plate is used to include not only the plate but also the film), applying high frequency welding electrodes on the opposite sides of the seam thus formed as shown by arrows B and C in FIG. 1A, and spot welding the seam by electric current or other heat source to assemble the container.

In another prior method shown in FIG. 1A, edges of two sheets of vinyl chloride 1' and 2' are brought to abut each other at an angle, an L shaped bar of vinyl chloride is placed along the corner formed by the abutted edges and the edges and the L shaped bar are fused together by spot weldings in the directions of arrows D and E.

However, with the method of FIG. 1A, the wall A has a tendency to bulge at the overlapped portion which will not only impair the appearance of the finished container, but also cause the container to be caught. While outside as shown by the arrow D, this portion only is fused by the applied heat so that ornamental patterns (uneven or irregular surface to imitate a leather, stripes and the like) previously formed are destroyed. If the extent of fusion or welding were decreased in order to decrease the above mentioned defects sheets of vinyl chloride forming the container would be separated during use. Although good appearance is the most important factor for these containers, both of the above mentioned prior methods failed to produce desirable products of high commercial value.

FIG. 4 illustrates one example of a vanity case constructed in accordance with this invention and comprising a lid section H, a side section K and a bottom section J which are formed by properly folding a single sheet, a side wall G which encircles three sides of the bottom section J, an inner wall L, a mirror 9 and a clamp 8 suitably secured to the case. As the sheet constituting the lid H, side section K and the bottom section J may be used a thick vinyl sheet or a hard vinyl sheet sandwiched between soft ornamental plates. This vanity case is constructed by applying the present method to the fabrication of its side wall G and the bottom section.

In the first step, as shown in FIG. 2A, a tape of thin vinyl chloride film 5 is placed longitudinally upon a tape 4 which is also made of vinyl chloride (it will be understood that the film, tape or sheet as herein used are all made of vinyl chloride) and has just enough length to constitute the side wall G and then an elongated knife edge shaped electrode F is pressed against one longitudinal edge of the film 5. This will cause bonding of the tape 4 and the film 5 by fusing or welding, shearing of the edge 7 which is discarded as scrap and upward warping of the film 5 as shown by an arrow. Thus the film 5 will be secured to the tape 4 at an acute angle.

In order to eliminate the edge scrap 7, a film 5' having a width twice that of the film 5 is placed centrally upon a tape 4' also having a width twice that of the tape 4, as shown in FIG. 3A. A wedge shaped electrode F is then applied to the center line of the film and tape to weld and cut them as shown in FIGS. 3A and 3B to obtain two side walls. This modified process is more economical in production cost and material than that in the first embodiment. While in FIGS. 2A and 2B a thick sheet of vinyl chloride 4' was used, a thick hard sheet 6 sandwiched between thin soft ornamental films 4" may equally be used, as shown in FIG. 3C.

A composite sub-assembly as shown in FIG. 2B can be obtained by any of the processes mentioned above, and the sub-assembly is then bent around the sides of the bottom section J as shown in FIG. 2C. This bent side wall is then placed on bottom section with their side edges aligned and the film 5 is welded to the bottom section by applying thereto high frequency electric heat in the direction of X. In this way the side wall G is securely bonded to the bottom plate.

The vanity case may be finished by applying an ornamental sheet M on the inner surface of the bottom section J. When applying the ornamental sheet, certain portion of the film 5 may be brought about the ornamental sheet as shown by the full line in FIG. 4, while the other portion beneath the ornamental sheet is shown by the broken line. The vanity case is finished by ataching a suitable clamp 8 and a mirror 9.

According to the method of construction of this invention the film 5 makes an acute angle with respect to the sheet or tape 4 so that an internal force as shown by an arrow Y will be created in the side wall G assuring intimate bonding of the lower edge thereof to the bottom section (see FIG. 3). Further, although the surface of the bottom section is often roughened, in other words craters Z are created by the high frequency electric heating utilized for welding, the lower edge snugly fit into these craters to provide good appearance. The film 5 which has been warped upwardly is finally pressed downwardly as shown in FIG. 5 which will create a reaction tending to slightly incline inwardly the side wall G. But this reaction is counteracted by the rigidity of the bent side wall. Thus the side wall assembled in accordance with this invention is more rigid to preserve its intended configuration than the prior side wall without inclining outwardly.

As will be obvious from FIG. 4, to weld the side wall to the bottom section the welding electrode is not applied to the outside of the side wall as in the conventional method as shown by arrows A and B of FIG. 1 and N and N' of FIG. 4, the appearance of these portions would not be impaired.

FIG. 4 shows a section of a cylindrical container constructed in accordance with this invention wherein a cylindrical side wall G' is firstly provided, a film 5 is bonded to the lower edge thereof in the same manner as disclosed hereinabove in connection with FIG. 2A, then a bottom plate J is applied to close the bottom opening of the cylindrical wall G' and the film 5 is bonded to the bottom plate J by applying high frequency welding electrodes along arrows X—X as shown in FIG. 6B. Alternatively, a tape 5 may be joined to one edge of a sheet and the sheet may then be formed into a cylinder.

The tape 5 of this embodiment serves to function similarly as the tape 5 in the previous embodiment to provide air tight and rigid bonding between the cylindrical wall and the bottom plate.

It will be understood by those skilled in the art that this invention can equally be applicable to the fabrication of various containers such as handbags, trunks, bags and the like.

Briefly stated, the present method is characterized by comprising the steps of welding a tape of plastic material to one side edge of one of sheets of plastic material to be bonded together, and welded said tape to the other of said sheets. It is to be understood that the tape may be welded to any surface other than the side wall of the container as illustrated in the embodiments.

Thus the invention can provide very beautiful products without relying upon costly procedure of using angle member so that the method can be very easily carried out by unskilled workmen.

While the invention has been explained by describing particular embodiments thereof, it will be apparent that improvements and modifications may be made without departing from the true spirit and scope of the invention as defined in the appended claim.

What I claim as new and desire to secure by Letters Patent of the United States is:

A method of constructing a thermoplastic container comprising the steps of overlapping a tape of thermoplastic material along at least a portion of the side edge of one sheet of thermoplastic material to be bonded together, heat sealing said tape to said side edge while simultaneously cutting the marginal portion thereof by means of a heated knife edge thereby causing the non-welded side of said tape to separate from said one sheet and heat sealing said non-welded side of said tape to another sheet.

References Cited by the Examiner

UNITED STATES PATENTS 3,149,355   9/1964   Greene _____ 156—251

EARL M. BERGERT, *Primary Examiner.*

DOUGLAS J. DRUMMOND, *Examiner.*